Patented May 5, 1953

2,637,723

UNITED STATES PATENT OFFICE 2,637,723

DISAZO DYESTUFFS CONTAINING COPPER

Walter Anderau, Basel, Switzerland, assignor to Ciba Limited, Basel, Switzerland, a Swiss firm No Drawing. Application May 17, 1950, Serial No. 162,611. In Switzerland August 5, 1949

4 Claims. (Cl. 260—148)

The present invention relates to the manufacture of new and valuable disazo dyestuffs containing copper. These new dyestuffs are prepared, according to this invention, by subjecting a disazo dyestuff, which as free acid corresponds to the general formula

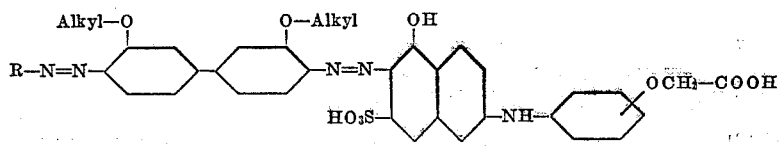

in which R indicates a naphthalene radical with at the most two sulfonic acid groups, which radical is coupled in ortho-position to a hydroxyl group, to the action of an agent providing copper, under such conditions that splitting up of the O-alkyl groups takes place with formation of the o:o'-dihydroxyazo copper complexes.

The disazo dyestuffs serving as starting materials in the present process may be obtained for example by coupling a tetrazotized 3:3'-dialkoxy-4:4'-diaminodiphenyl, especially dianisidine, in either sequence, on one side with 2-(carboxymethoxyphenyl)-amino-5 - hydroxynaphthalene-7-sulfonic acid and on the other side with a coupling component of the naphthalene series containing at the most two sulfonic acid groups and coupling in o-position to a hydroxyl group.

As such naphthalene components coupling in o-position to a hydroxyl group, use may be made for example of those containing no sulfonic acid group, such as 2-hydroxynaphthalene or 1-hydroxy-4-methoxynaphthalene, or those containing only one sulfonic acid group such as 2-hydroxynaphthalene-4- or -6-sulfonic acid or 1-hydroxynaphthalene-3-, -4- or -5-sulfonic acid. However hydroxynaphthalenes may be employed with advantage which contain two sulfonic acid groups, such as 1-chloro-8-hydroxynaphthalene-3:6-disulfonic acid, 1-hydroxy-8-alkoxynaphthalene-3:6-disulfonic acid, 1-hydroxynaphthalene-4:8- or -3:6-disulfonic acid, 2-hydroxynaphthalene -6:8- or -3:6-disulfonic acid and especially 1-hydroxynaphthalene-3:8-disulfonic acid.

Moreover such disazo dyestuffs of the above general formula may be employed as starting materials as are symmetrically constituted and in which the radical R likewise corresponds to the formula

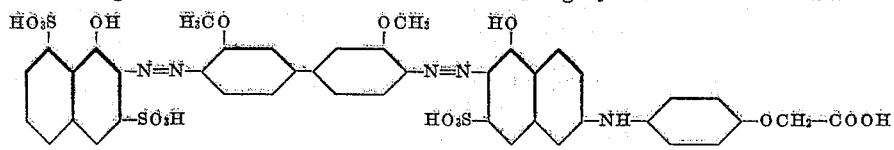

When two different coupling components are employed the sequence of the two couplings may be as desired; advantageously the coupling with the more difficulty coupling component is carried out first.

The carboxymethoxy group —OCH₂—COOH may take up various positions in the phenyl nucleus with respect to the NH— group, for example the meta- but more advantageously the para-position to the NH— group.

An especially valuable dyestuff is obtained according to the present invention by the application of the starting dyestuff of the formula According to the present invention the disazo dyestuffs are treated in such a way with an agent providing copper that with splitting up of the alkoxy, especially methoxy, groups contained in the diaminodiphenyl components, the corresponding o:o'-dihydroxyazo copper complexes are produced. Methods which lead to such a dealkylating coppering are generally known. In many cases that process has proved especially suitable according to which, with the application of copper tetramine complexes in the presence or absence of an excess of ammonia, the coppering is carried out in an aqueous medium within one to several hours at a temperature in the neighbourhood of 100° C. Of particular advantage in many cases is the process of U. S. patent application Serial No. 778,734, according to which the operation is conducted in the presence of hydroxyalkylamines, especially ethanolamine or of copper complexes derived therefrom.

The new dyestuffs of the present invention contain o:o'-dihydroxyazo copper complexes and correspond to the general formula

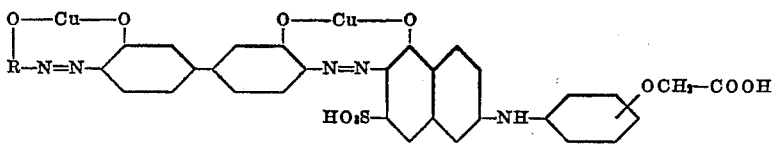

in which R indicates a naphthalene radical containing at the most two sulfonic acid groups, the azo and the O—Cu— group being in o-position to one another, and in which the —OCH$_2$—COOH group is advantageously in para-position to the —NH— group. In this connection it is to be remarked that the method of setting out the formulae here selected is not intended to give any information regarding the distribution of the electrovalencies and covalencies.

trated ammonia and stirred for a few hours at 90–100° C., whereby the coppering takes place with the formation of the o-o'-dihydroxyazo complexes. The dyestuff containing copper is separated by addition of 200 parts of sodium chloride, filtered and dried.

The coppering can also be carried out with advantage with copper acetate or a mixture of copper sulfate and sodium acetate at temperatures above 100° C., for example by drying and heating for a few hours to about 125° C. the reaction mixture or the complex primarily produced (that is to say, the copper compound produced by the action on the dyestuff of the agent providing copper and in which no splitting up of the methoxy groups of the diphenyl radical has yet taken place).

A dark powder is obtained which dissolves in water with a pure blue color and dyes cotton and artificial silks from regenerated cellulose from a bath containing sodium sulfate in pure blue shades of good fastness to light.

The coppered dyestuff has the formula

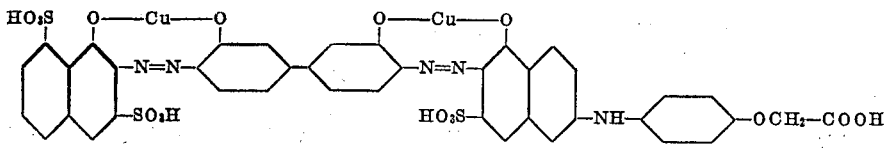

The new copper-containing azo dyestuffs of the present invention can be employed for the dyeing and printing of a wide variety of materials such as wool and silk but especially fibers containing cellulose such as cotton, linen and also artificial silk and staple fiber from regenerated cellulose. Blue dyeings are obtained of good fastness to light, which withstand a customary crease-proof treatment, for example by means of urea-formaldehyde artificial resins.

The following examples illustrate the invention, the parts and percentages being by weight:

*Example 1*

24.4 parts of dianisidine are suspended in 200 parts of water and 50 parts of hydrochloric acid of 30 per cent. strength and tetrazotized at 0–2° C. with 14 parts of sodium nitrite. The clear solution of the tetrazo compound is caused to flow as rapidly as possible into an ice-cold solution of 32 parts of 1-hydroxynaphthalene-3:8-disulfonic acid and 30 parts of anhydrous sodium carbonate in 450 parts of water. After about 15 minutes the formation of the diazoazo compound has taken place whereupon an ice-cold solution of 40 parts of 2-(4'-carboxymethoxyphenyl)-amino-5-hydroxynaphthalene-7-sulfonic acid and 10 parts of anhydrous sodium carbonate in 300 parts of water is allowed to flow in. After a few hours the suspension of the disazo dyestuff produced is heated to 60° C., about 150 parts of sodium chloride are added and the dyestuff which now precipitates is filtered off.

A solution of this dyestuff paste in 2000 parts of water prepared at 80° C. is treated with 52 parts of copper sulfate and 200 parts of concen- A cupriferous dyestuff of quite similar properties is obtained, when the 1-hydroxynaphthalene-3:8-disulfonic acid in the above example is replaced by 1-hydroxynaphthalene-4:8-disulfonic acid. The 2-(4'-carboxymethoxyphenyl)-amino-5-hydroxynaphthalene-7-sulfonic acid can be prepared as follows:—240 parts of 2-amino-5-hydroxynaphthalene-7-sulfonic acid and 240 parts of 1-amino-4-carboxymethoxybenzene are stirred to form a paste with 400 parts of water and the whole is neutralized by addition of 135 parts of anhydrous sodium carbonate. 600 parts of sodium bisulfite solution of 40 per cent. strength are then added and the reaction mixture is placed in an autoclave equipped with a stirrer and treated for 24 hours at 100 to 104° C. After cooling to 20° C., the residue is filtered off, dissolved in 2000 parts of water at 70° C. with addition of 25 parts of anhydrous sodium carbonate, and 500 parts of sodium chloride are added. The 2-(4'-carboxymethoxyphenyl)-amino-5-hydroxynaphthalene-7-sulfonic acid thus precipitates in the form of its sodium salt in a very pure state. When the suspension has become cold, the product is filtered off and dried.

*Example 2*

24.4 parts of dianisidine are dissolved in 200 parts of water with 25 parts of 30 per cent. hydrochloric acid, thereupon treated with a further 25 parts of 30 per cent. hydrochloric acid and tetrazotized at 0–2° C. with 14 parts of sodium nitrite. The clear solution of the tetrazo compound is allowed to flow into an ice-cold solution of 80 parts of 2-(4'-carboxy-methoxyphenyl)-amino-5-hydroxynaphthalene-7-sulfonic acid and 50 parts of anhydrous sodium carbonate in 650 parts of water. After a few hours the suspension of the disazo dyestuff produced is heated to 60° C., about 100 parts of sodium chloride added and the dyestuff now precipitated filtered off.

The dyestuff paste obtained is pasted with a little water to a fairly thick paste, treated with a solution of 56 parts of crystalline copper sulfate and 50 parts of crystalline sodium acetate in 500 parts of water and stirred for 10 hours. Thereupon the paste is evaporated in vacuum and when the evaporation is complete maintained for 6 hours at 125–128° C., still under reduced pressure. The copper compound of the o-o'-dihydroxyazo dyestuff is thereby obtained as a dry blackish powder which is treated with 2–5 per cent. of its weight of anhydrous sodium carbonate.

The dyestuff powder dissolves in water with a reddish-blue color and dyes cotton and artificial silks from regenerated cellulose from a bath containing sodium sulfate in pure reddish-blue shades of good fastness to light.

The demethylating coppering of the dyestuff paste obtained according to the above directions can also take place in aqueous solution by dissolving the dyestuff paste in 4000 parts of water, treating with 55 parts of crystalline copper sulfate, 100 parts of concentrated ammonia and 25 parts of monoethanolamine and boiling water under reflux for 12–15 hours. The copper compound of the o:o'-dihydroxyazo dyestuff thus produced is precipitated with 200 parts of sodium chloride, filtered and dried. The dyestuff powder obtained has the above specified dyeing properties.

The coppered dyestuff has the formula

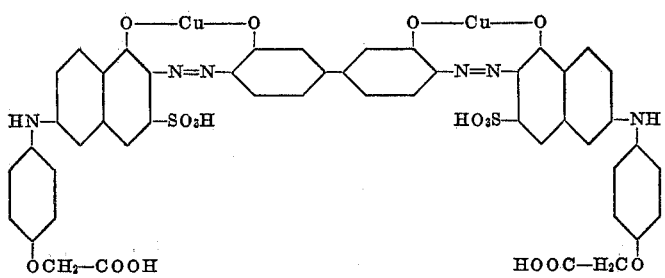

Example 3

100 parts of cotton are entered at 40° C. into a dyebath which contains in 3000 parts of water, 1.5 parts of the dyestuff obtained according to Example 1 and 1 part of anhydrous sodium carbonate, dyeing is carried out for ½ hour with raising of the temperature to 90° C., 40 parts of crystallized sodium sulfate are added and dyeing carried out for a further ½ hour at 90–95° C. The cotton is thereupon rinsed and finished in the customary manner. It is dyed in fast pure blue shades.

What I claim is:

1. A cupriferous diazo-dyestuff of the formula

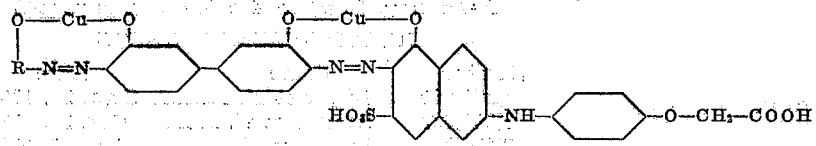

wherein

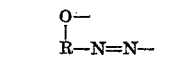

stands for a member of the group consisting of the radicals

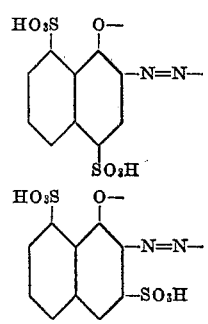

and

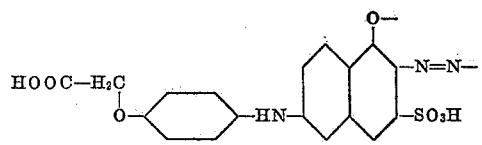

2. The cupriferous dyestuff of the formula

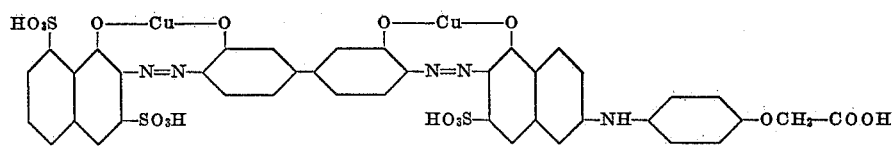

3. The cupriferous dyestuff of the formula

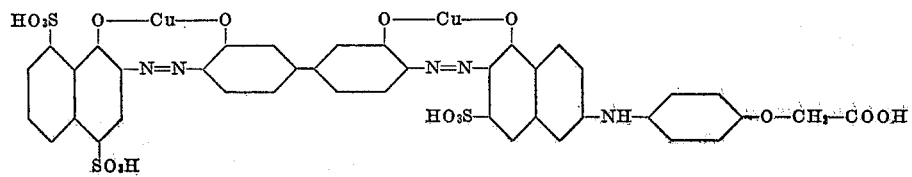

4. The cupriferous dyestuff of the formula
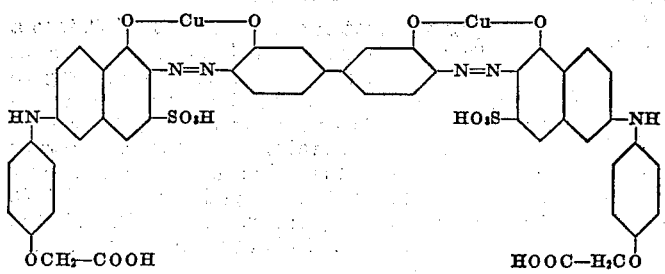
WALTER ANDERAU.
References Cited in the file of this patent
UNITED STATES PATENTS
| Number | Name | Date |
|---|---|---|
| 1,879,240 | Hilger et al. | Sept. 27, 1932 |
| 1,889,732 | Stusser et al. | Nov. 29, 1932 |
| 2,426,977 | Straub et al. | Sept. 9, 1947 |